US008862651B2

(12) United States Patent
Lambert

(10) Patent No.: US 8,862,651 B2
(45) Date of Patent: Oct. 14, 2014

(54) METHOD AND APPARATUS FOR MODULUS REDUCTION

(75) Inventor: Robert John Lambert, Cambridge (CA)

(73) Assignee: Certicom Corp., Mississauga (CA)

( * ) Notice: Subject to any disclaimer, the term of this patent is extended or adjusted under 35 U.S.C. 154(b) by 1002 days.

(21) Appl. No.: 12/609,772

(22) Filed: Oct. 30, 2009

(65) Prior Publication Data

US 2010/0146028 A1 Jun. 10, 2010

Related U.S. Application Data

(60) Provisional application No. 61/109,558, filed on Oct. 30, 2008.

(51) Int. Cl.

| | |
|---|---|
| ***G06F 7/38*** | (2006.01) |
| ***G06F 7/72*** | (2006.01) |
| ***H04L 9/32*** | (2006.01) |
| ***H04L 9/30*** | (2006.01) |

(52) U.S. Cl.

CPC .............. *H04L 9/3066* (2013.01); *G06F 7/727* (2013.01); *G06F 7/72* (2013.01); *H04L 9/3252* (2013.01); *H04L 2209/043* (2013.01); *G06F 7/728* (2013.01); *H04L 2209/12* (2013.01)

USPC .......................................................... 708/491

(58) Field of Classification Search

CPC ....................................................... G06F 7/727

USPC ................................................. 708/491, 492

See application file for complete search history.

(56) References Cited

U.S. PATENT DOCUMENTS

| | | | | |
|---|---|---|---|---|
| 5,189,635 A * | 2/1993 | Ohki | ............................ | 708/706 |
| 5,724,279 A * | 3/1998 | Benaloh et al. | ............... | 708/491 |
| 5,764,554 A * | 6/1998 | Monier | ......................... | 708/491 |
| 6,415,310 B1 * | 7/2002 | Takenaka et al. | ............ | 708/491 |
| 6,546,104 B1 * | 4/2003 | Shimbo et al. | ................. | 380/28 |
| 2004/0098435 A1 * | 5/2004 | Moore | ......................... | 708/491 |

OTHER PUBLICATIONS

Montgomery, P.; "Modular Multiplication Without Trial Division"; Mathematics of Computation; Apr. 1985; pp. 519 to 521; vol. 44, No. 177.

National Institute of Standards and Technology; "Recommended elliptic curves for federal government use", Jul. 1999.

Brown, M. et al.; "Software Implementation of the Nist Elliptic Curves Over Prime Fields"; Proceedings of the 2001 Conference on Topics in Cryptology: The Cryptographer's Track at RSA; Lecture Notes in Computer Science; 2001; pp. 250 to 265; vol. 2020; Springer Verlag.

(Continued)

*Primary Examiner* — Chuong D Ngo

(74) *Attorney, Agent, or Firm* — Shahrzad Esmaili; John R. S. Orange; Blake, Cassels & Graydon LLP

(57) ABSTRACT

A modulo reduction is performed on a value a represented as an ordered sequence of computer readable words. The lowest order words are eliminated by substituting an equivalent value represented by higher order words for each of the lower order words. The lowest order words are eliminated until the sequence has a word length corresponding to the modulus. Carries and borrows resulting from the substitution are propagated from lower order words to higher order words. Further reduction is performed to maintain the word length of the sequence to that of the modulus. The further reduction may be determined by examination of a carryover bit or may be performed a predetermined number of times without examination.

26 Claims, 7 Drawing Sheets

(56) References Cited

OTHER PUBLICATIONS

Menezes, Alfred J. et al.; Handbook of Applied Cryptography; 1997; pp. 600 to 606, 631 and 632; CRC Press.

Hankerson, D. et al; Guide to Elliptic Curve Cryptography; 2004; pp. 38, 39 and 70, 71; Springer-Verlag; New York.

X9.62—1998; Public Key Cryptography for the Financial Services Industry: The Elliptic Curve Digital Signature Algorithm (ECDSA); Jan. 7, 1999; American National Standards Institute.

Crandall, R. et al.; Prime Numbers A Computational Perspective; $2^{nd}$ ed.; 2005; Chapter 9, Fast Algorithms for Large-Integer Arithmetic, Section 9.2.1., pp. 443 to 450, References, pp. 547 to 575; Springer.

Mulligan, Reid; International Search Report from corresponding PCT Application No. PCT/CA2009/001557; search completed Mar. 8, 2010.

Menezes, Alfred J. et al.; Handbook of Applied Cryptography; 1997; Chapter 14 Efficient Implementation; pp. 591 to 634; CRC Press.

Groaschadl, J. et al; "Instruction Set Extensions for Fast Arithmetic in Finite Fields GB(p) and GF($2^m$)";Cryptographic Hardware and Embedded Systems—CHES 2004; Jul. 8, 2004; LNCS 3156; pp. 133 to 147; ISBN: 978-3-540-22666-6.

Koc, Cetin Kaya et al.; "Analyzing and Comparing Montgomery Multiplication Algorithms'"; IEEE Micro, 16(3); Jun. 1996; pp. 26 to 33.

Prins, Leendert; Supplementary Search Report from corresponding European Application No. 09822945.3; search completed Mar. 8, 2010.

* cited by examiner

| | $2^{12W}$ | $2^{11W}$ | $2^{10W}$ | $2^{9W}$ | $2^{8W}$ | $2^{7W}$ | $2^{6W}$ | $2^{5W}$ | $2^{4W}$ | $2^{3W}$ | $2^{2W}$ | $2^{1W}$ | $2^{0W}$ | |
|---|---|---|---|---|---|---|---|---|---|---|---|---|---|---|
| | | $a_{11}$ | $a_{10}$ | $a_9$ | $a_8$ | $a_7$ | $a_6$ | $a_5$ | $a_4$ | $a_3$ | $a_2$ | $a_1$ | $a_0$ | 100 |
| | | $a_{11}$ | $a_{10}$ | $a_9$ | $a_8$ | $a_7$ | $a_6$ | $a_5$ | $a_4$ | $a_3$ | $a_2$ | $a_1$ | $a_0$ | 101a |
| + | | | | | | | $+a_0$ | | | | $-a_0$ | | $-a_0$ | 101b |
| | | $a_{11}$ | $a_{10}$ | $a_9$ | $a_8$ | $a_7$ | $b_6$ | $a_5$ | $a_4$ | $a_3$ | $b_2$ | $a_1$ | 0 | 101c |
| | | | | | | $(+x_7)$ | | | | $(-x_3)$ | | | | 101d |
| | | $a_{11}$ | $a_{10}$ | $a_9$ | $a_8$ | $a_7$ | $b_6$ | $a_5$ | $a_4$ | $a_3$ | $b_2$ | $a_1$ | 0 | 102a |
| | | | | | | $(+x_7)$ | | | | $(-x_3)$ | | | | 102b |
| + | | | | | | $+a_1$ | | | | $-a_1$ | | $-a_1$ | | 102c |
| | | $a_{11}$ | $a_{10}$ | $a_9$ | $a_8$ | $b_7$ | $b_6$ | $a_5$ | $a_4$ | $b_3$ | $b_2$ | 0 | 0 | 102d |
| | | | | | $(+x_8)$ | | | | $(-x_4)$ | | | | | 102e |
| | | $a_{11}$ | $a_{10}$ | $a_9$ | $a_8$ | $b_7$ | $b_6$ | $a_5$ | $a_4$ | $b_3$ | $b_2$ | 0 | 0 | 103a |
| | | | | | $(+x_8)$ | | | | $(-x_4)$ | | | | | 103b |
| + | | | | | $+b_2$ | | | | $-b_2$ | | $-b_2$ | | | 103c |
| | | $a_{11}$ | $a_{10}$ | $a_9$ | $b_8$ | $b_7$ | $b_6$ | $a_5$ | $b_4$ | $b_3$ | 0 | 0 | 0 | 103d |
| | | | | $(+x_9)$ | | | | $(-x_5)$ | | | | | | 103e |
| | | $a_{11}$ | $a_{10}$ | $a_9$ | $b_8$ | $b_7$ | $b_6$ | $a_5$ | $b_4$ | $b_3$ | 0 | 0 | 0 | 104a |
| | | | | $(+x_9)$ | | | | $(-x_5)$ | | | | | | 104b |
| + | | | | $+b_3$ | | | | $-b_3$ | | $-b_3$ | | | | 104c |
| | | $a_{11}$ | $a_{10}$ | $b_9$ | $b_8$ | $b_7$ | $b_6$ | $b_5$ | $b_4$ | 0 | 0 | 0 | 0 | 104d |
| | | | $(+x_{10})$ | | | | $(-x_6)$ | | | | | | | 104e |
| | | $a_{11}$ | $a_{10}$ | $b_9$ | $b_8$ | $b_7$ | $b_6$ | $b_5$ | $b_4$ | 0 | 0 | 0 | 0 | 105a |
| | | | $(+x_{10})$ | | | | $(-x_6)$ | | | | | | | 105b |
| + | | | $+b_4$ | | | | $-b_4$ | | $-b_4$ | | | | | 105c |
| | | $a_{11}$ | $b_{10}$ | $b_9$ | $b_8$ | $b_7$ | $c_6$ | $b_5$ | 0 | 0 | 0 | 0 | 0 | 105d |
| | | $(-x_{11})$ | | | | $(-x_7)$ | | | | | | | | 105e |
| | | $a_{11}$ | $b_{10}$ | $b_9$ | $b_8$ | $b_7$ | $c_6$ | $b_5$ | 0 | 0 | 0 | 0 | 0 | 106a |
| | | $(+x_{11})$ | | | | $(-x_7)$ | | | | | | | | 106b |
| + | | $+b_5$ | | | | $-b_5$ | | $-b_5$ | | | | | | 106c |
| | | $b_{11}$ | $b_{10}$ | $b_9$ | $b_8$ | $c_7$ | $c_6$ | 0 | 0 | 0 | 0 | 0 | 0 | 106d |
| | $(+x_{12})$ | | | | $(-x_8)$ | | | | | | | | | 106e |
| | | $c_{11}$ | $c_{10}$ | $c_9$ | $c_8$ | $c_7$ | $c_6$ | 0 | 0 | 0 | 0 | 0 | 0 | 107a |
| | $(\pm y_{12})$ | | | | | | | | | | | | | 107b |
| | | $c_{11}$ | $c_{10}$ | $c_9$ | $c_8$ | $c_7$ | $c_6$ | 0 | 0 | 0 | 0 | 0 | 0 | 108a |
| | | | | | $(\pm y_{12})$ | | $(\pm y_{12})$ | | | | | | | 108b |
| | | $d_{11}$ | $d_{10}$ | $d_9$ | $d_8$ | $d_7$ | $d_6$ | 0 | 0 | 0 | 0 | 0 | 0 | 109a |
| | $(+z_{12})$ | | | | | | | | | | | | | 109b |
| | | $d_{11}$ | $d_{10}$ | $d_9$ | $d_8$ | $d_7$ | $d_6$ | 0 | 0 | 0 | 0 | 0 | 0 | 110a |
| | | | | | $(+z_{12})$ | | $(+z_{12})$ | | | | | | | 110b |
| | | $e_{11}$ | $e_{10}$ | $e_9$ | $e_8$ | $e_7$ | $e_6$ | | | | | | | 110c |

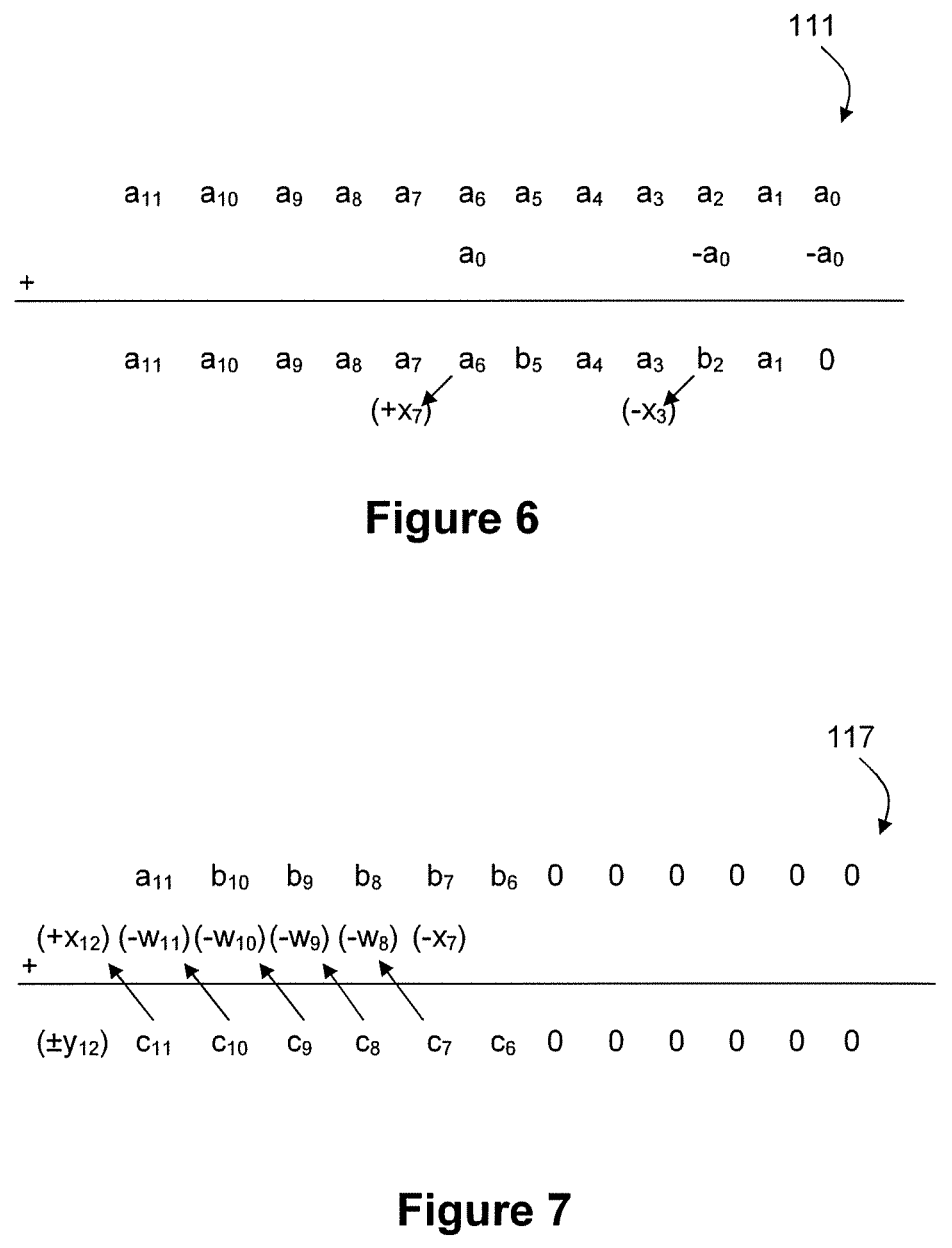

$$
\begin{array}{rcccccccccccc}
 & a_{11} & a_{10} & a_9 & a_8 & a_7 & a_6 & a_5 & a_4 & a_3 & a_2 & a_1 & a_0 \\
+ & & & & & & a_0 & & & & -a_0 & & -a_0 \\
\hline
 & a_{11} & a_{10} & a_9 & a_8 & a_7 & a_6 & b_5 & a_4 & a_3 & b_2 & a_1 & 0 \\
 & & & & & (+x_7) & & & & (-x_3) & & &
\end{array}
$$

$$
\begin{array}{rcccccccccccc}
 & a_{11} & b_{10} & b_9 & b_8 & b_7 & b_6 & 0 & 0 & 0 & 0 & 0 & 0 \\
+ (+x_{12}) & (-w_{11}) & (-w_{10}) & (-w_9) & (-w_8) & (-x_7) & & & & & & & \\
\hline
(\pm y_{12}) & c_{11} & c_{10} & c_9 & c_8 & c_7 & c_6 & 0 & 0 & 0 & 0 & 0 & 0
\end{array}
$$

Figure 7

| | $2^{17W}$ | $2^{16W}$ | $2^{15W}$ | $2^{14W}$ | $2^{13W}$ | $2^{12W}$ | $2^{11W}$ | $2^{10W}$ | $2^{9W}$ | $2^{8W}$ | $2^{7W}$ | $2^{6W}$ | $2^{5W}$ | $2^{4W}$ | $2^{3W}$ | $2^{2W}$ | $2^{1W}$ | $2^{0W}$ | |
|---|---|---|---|---|---|---|---|---|---|---|---|---|---|---|---|---|---|---|---|
| | $a_{17}$ | $a_{16}$ | $a_{15}$ | $a_{14}$ | $a_{13}$ | $a_{12}$ | $a_{11}$ | $a_{10}$ | $a_9$ | $a_8$ | $a_7$ | $a_6$ | $a_5$ | $a_4$ | $a_3$ | $a_2$ | $a_1$ | $a_0$ | 120 |
| | | $2^9$ | 0 | 0 | 0 | 0 | 0 | 0 | 0 | 0 | 0 | 0 | 0 | 0 | 0 | 0 | 0 | 0 | 121 |
| | $a_{17}$ | $a_{16}$ | $a_{15}$ | $a_{14}$ | $a_{13}$ | $a_{12}$ | $a_{11}$ | $a_{10}$ | $a_9$ | $a_8$ | $a_7$ | $a_6$ | $a_5$ | $a_4$ | $a_3$ | $a_2$ | $a_1$ | $a_0$ | |
| + | $s_1$ | $s_0$ | | | | | | | | | | | | | | | | $-a_0$ | 122 |
| $x_{18}$ | $b_{17}$ | $b_{16}$ | $a_{15}$ | $a_{14}$ | $a_{13}$ | $a_{12}$ | $a_{11}$ | $a_{10}$ | $a_9$ | $a_8$ | $a_7$ | $a_6$ | $a_5$ | $a_4$ | $a_3$ | $a_2$ | $a_1$ | 0 | |

Figure 8

METHOD AND APPARATUS FOR MODULUS REDUCTION

This application claims priority from U.S. Application No. 61/109,558 filed on Oct. 30, 2008 the contents of which are incorporated herein by reference.

TECHNICAL FIELD

The following relates generally to methods and apparatus for modulus reduction and has particular utility in performing modular arithmetic in a cryptographic system.

BACKGROUND

There are many applications where computations are performed using finite field operations. In cryptography, e.g. public key cryptography, operations such as multiplication or exponentiation of elements in some group $Z_n$ may be required, where modular arithmetic is used to operate on the integers, or possibly on polynomials taken modulo some reduction polynomial, such as when computing in an extension of a finite field. A particular class of groups used increasingly in cryptography are elliptic curve groups, which are a tuples of elements in an underlying field that satisfy the equation of an elliptic curve.

Many operations in such groups require reduction. For example, modular arithmetic is used when multiplying two numbers modulo some number n. The classical approach to this type of operation is to first perform the multiplication and then calculate the remainder of the product modulo some number n. The calculation of the remainder is referred to as reduction.

The classical approach to reduction is well known in the art. Although it is simple for basic operations such as in multi-precision calculations and does not require precomputation, the classical method of calculating the remainder is considered slow, due to the process of classical modular reduction being computationally equivalent to dividing two numbers.

Alternative methods of modulus reduction are known. For example, the American National Standards Institute outlines in the document "X9.62:1998 Public Key Cryptography for the Financial Services Industry: The Elliptic Curve Digital Signature Algorithm (ECDSA), 1998" methods for efficient high-to-low reduction of large integers.

It is also possible to obtain efficiencies by selection of the finite field group that is used. The National Institute for Standards and Technology (NIST) defines elliptic curves in the document "Recommended elliptic curves for Federal Government use, 1999" and lists word aligned primes that have non-zero bit values at word boundaries. Typically, these primes have a representation that has −1, +1 on 32-bit boundaries, which simplifies modular computation. The book "Guide to Elliptic Curve Cryptography, Springer Verlag, 2004" by Hankerson et al. provides techniques using such special form primes to yield efficient high-to-low reduction algorithms. In general, simple word aligned equivalents for higher order components are substituted in terms of its lower-order components. However, it is still necessary to reduce that final result modulo by some number n. Moreover, high-to-low modulus reduction methods must deal with carries that appear from below as the reduction proceeds.

A more efficient form of reduction is known as Montgomery reduction. Montgomery reduction is described in "Handbook of Applied Cryptography, CRC Press, 1997" by Menezes et al. This method relies on performing certain precomputations to allow many calculations to be done faster. For example, if A is the product of two integers and is to be reduced mod n, then to obtain a Montgomery reduction modulo n, to the extent R, a multiple m of n is added to A so that $A+mn\equiv 0 \pmod R$. The multiple m is calculated using $m\equiv\mu A \pmod R$, where $\mu=(-1/n) \pmod R$ and is precalculated and stored.

Using Montgomery reduction, low-order components are reduced instead of high-order components. This low-to-high reduction is convenient and efficient as it follows the natural flow of carries in the reduced component. Montgomery reduction also benefits from the fact that the steps of multiplication and shifting are generally faster than division on most computing machines.

BRIEF DESCRIPTION OF THE DRAWINGS

Embodiments will now be described, by way of example only, with reference to the appended drawings wherein:

FIG. 3(*b*) is a schematic diagram similar to FIG. 3(*a*) of a generalized method of performing a modulus reduction process.

FIG. 4 is a table of results of calculations for an example performed according to the embodiment of FIG. 3*a*).

FIG. 6 is a representation of the generation of borrow and carryover values during a single summation step.

FIG. 7 is a representation of the flow of data during one of the steps of FIG. 3(*a*).

FIG. 8 is a table, similar to FIG. 4 of an alternative embodiment utilizing a different prime.

DETAILED DESCRIPTION

Figure 1:
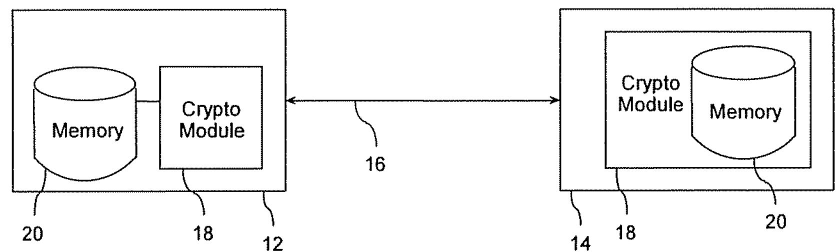
FIG. 1 is a schematic block diagram of a cryptographic communication system.

While efficient in cases where the reduction operation is repeated, the steps of Montgomery reduction require precomputation and storage for $(-1/n) \pmod R$, as well as multiplications to calculate m, as well as the multiplication of m and n and subsequent addition into the value to be reduced. The precomputation and multiplication requirement for Montgomery reduction can be a drawback, especially when compared against reduction from above employing special form primes.

As is explained in further detail below, a modulus reduction machine used for Montgomery reduction can be utilized to perform modulus reduction without the need for precomputation.

This method has many advantages. Most notably, the computationally intensive modulus reduction operations are replaced with a simple modulus reduction process involving only additions, subtractions, and substitutions. The successive elimination of the lowest order words, that is a low-to high reduction, eliminates carry from below problems of high-to-low reduction. No multiplication or precomputation is required, and the simple operations used for modulus determination may lead to reduction in the complexity of a modulus reduction machine, thus reducing cost of manufacture, power consumption and operating times.

It has been recognized that by using the property $a_0V \equiv a_0$ (mod p), where p=V−1, any value $a_0$ can be substituted by an equivalent value $a_0V$ modulo p represented by a higher order word or words. By using a low-to-high substitution as explained below, the correct values for a modulus reduction can also be produced using successive substitution and addition operations.

The reduction proceeds through a series of iterations with the representation of the value being reduced stored in a register as a block of digital words. At each iteration, a substitution process is used to eliminate the lowest order digital word. The original integer is thus reduced from the lowest word to the highest word. The iteration continues until the remaining words have a length less than modulus.

A preferred embodiment uses a pseudo-Mersenne prime modulus in the form $p=2^wC-1$, where C is a sum of one or more positive powers of base 2, and w is word length, i.e. the number of computer readable bits in each word.

In one embodiment, the pseudo-Mersenne prime used is the NIST recommended prime $p_{192}$, which is a 192 bit prime which has the form $2^{192}-2^{64}-1$. This has an advantage in that it is word aligned when used in a register containing 32-bit digital words. Accordingly, $V=2^{192}-2^{64}$ so that $a_0(2^{192}-2^{64}) \equiv a_0$(mod p). The equivalence $a_0(2^{192}-2^{64}) \equiv a_0$(mod $p_{192}$) is used to perform an equivalent higher order substitution of the lowest 32-bit digital word in the register block at each step, thereby eliminating the lower order word and reducing the integer from low to high.

In another embodiment, a non-word aligned prime used is $p_{521}$, which may be decomposed as $2^{521}-1$. In this case, the equivalence $2^{521}a_0 \equiv a_0$(mod $p_{521}$) is used to again eliminate the lowest 32-bit digital word in the register block at each step. Because 521 does not align on a 32-bit word boundary, this embodiment involves shifting to produce high-order equivalents for low order words.

Referring now to FIG. 1, a cryptographic system 10 generally comprises a first correspondent 12 that communicates with a second correspondent 14 over a communication channel 16. Each correspondent 12,14 is a computing device, such as a computer, server, cell phone, PDA, ATM or the like, that includes processors, memory, power supplies, input and output devices necessary to perform the designated functions. Each 12,14 correspondent includes a cryptographic module 18, which either has its own memory 20 for storing inputs, outputs and intermediate portions of cryptographic operations, or has access to an external memory 20 that is part of the correspondent (12, 14). It can be seen that in the example shown in FIG. 1, the first correspondent 12 includes a memory 20 external to the cryptographic module 18 and the second correspondent 14 includes memory 20 that is internal to the cryptographic module 18 to illustrate that the capability to store data can be provided in any suitable arrangement. It will also be appreciated that the memory 20 can be external to and accessible (e.g. via a network connection etc.) to the correspondent 12, 14 if necessary or desired.

The cryptographic module 18 is configured to perform cryptographic operations such as encryption/decryption, signing and modular arithmetic, etc. Typically, the cryptographic module 18 includes a random number generator, secure storage to store private keys and an arithmetic unit to perform cryptographic operations. In this example, the cryptographic module 18 also includes a modulus reduction machine 22, further detail of which is shown in FIG. 2.

Figure 2:
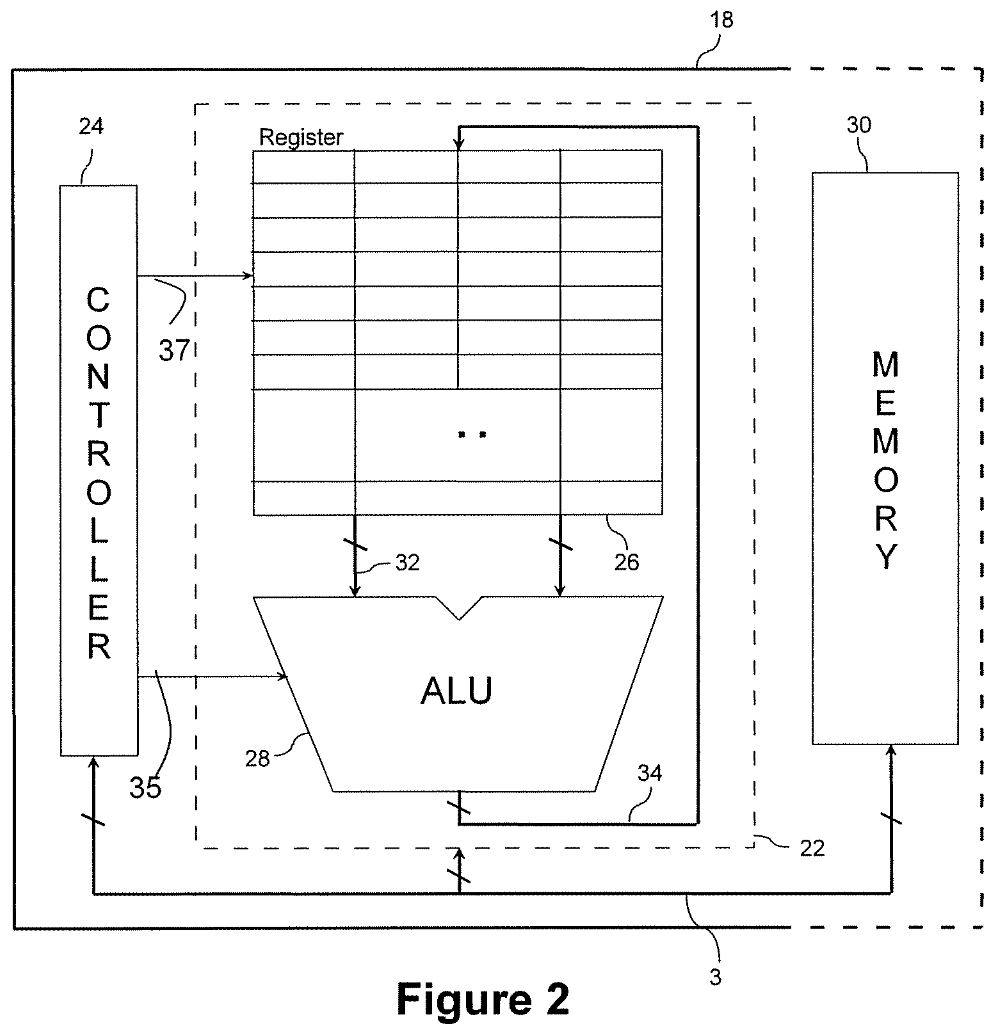
FIG. 2 is a schematic block diagram of the cryptographic module of FIG. 1.

As can be seen in FIG. 2, the cryptographic module 18 includes a controller 24, the modulus reduction machine 22, and a memory 30. The machine 22 generally comprises a register file 26 and an arithmetic logic unit (ALU) 28.

The memory 30 may also be included in the machine 22 or be external to the machine 22 as illustrated. It will be appreciated that the memory 30 may comprise all or part of the memory 20 (shown in FIG. 1) or may be provided as a separate component in the cryptographic module 18 as shown. The memory 30 may include random access memory (RAM), read only memory (ROM) and/or any other type of suitable memory structure.

The register file 26 is a group of general purpose registers, which may be used as intermediate storage for operations performed for and/or by the cryptographic module 18. The register file 26 communicates with the ALU 28 via data input buses 32. The ALU 28 includes integer arithmetic circuitry controlled by controller 24. A data output or result bus 34 is provided from the ALU 28 to the register file 26 for writing results of computations performed in the ALU 28 to the register file 26.

Computational operations of the ALU 28 are controlled via hard-wired or programmed instructions residing in or accessible to the controller 24 and communicated to the ALU 28 via an instruction bus 35. A memory bus 36 is also provided to enable the controller 24 and the machine 22 to utilize memory 30 when performing and outputting results of the operations of the ALU 28. The ALU 28 and registers 26 may be used to perform a variety of operations under the direction of controller 24. The controller 24 directs data to be stored in the register files 26 at designated addresses and to be read from the register files for operation by the ALU 28. The result of the operation is stored in the register files 26 for subsequent use. The operations performed by the ALU 28 are determined by the controller 24, which also determines the address in the register files 26 at which the results are stored through a register control bus 37.

The modulus reduction machine 22 may perform a Montgomery reduction as part of the cryptographic operations performed by crypto module 18, for example, when correspondent 12 wishes to sign a message m that is to be sent to the correspondent 14. The correspondents 12, 14, each share parameters of an elliptic curve cryptosystem with an elliptic curve group E defined over finite field Fp. The parameters, which include a base point P, are stored in the memory 30 and accessible to the controller 24. Similar operations can implement elliptic curves over extension fields or higher genus curves, such as hyperelliptic curves.

The signature can be performed in accordance with an established signature protocol, such as the ECDSA. In that protocol, the correspondent 12 has a long term private public key pair a, aP and utilizes a random number generator within the crypto module 18 to generate an ephemeral private key k. The arithmetic unit is utilized to compute a corresponding ephemeral public key kP. The private keys a, k are stored in a secure portion of memory 30. To perform a signature on the message m, the x coordinate of the ephemeral public key kP is converted to an integer $\overline{X}$. A signature component r is computed by reducing $\overline{X}$ mod p.

The message m is hashed using a cryptographic hash H, such as SHA-2, to provide e=H(m) and a second signature component s is computed from $s=k^{-1}(e+ar)$ mod p.

The signature on the message m is (r,s) and is sent with the message m to the correspondent 14. The correspondent 14 can verify the signature using the message m, the signature components r,s and the correspondent's 12 long term public key aP as follows:

1) Compute e=H(m).
2) Compute $w=s^{-1}$ mod (p).
3) Compute $u_1$=ew mod (n) and $u_2$=rw mod p.

4) Compute $X=u_1P+u_2$ (aP) which is a point $(x_1,y_1)$ and confirm that $X\neq\infty$.

5) Convert $(x_1)$ to a integer $\overline{x}_1$ and compute $v_1=x \bmod p$.

6) Confirm that $v_1=r$ to verify the signature.

It will be seen from the above that signing the message m requires two modular reductions and verification requires four modular reductions. Moreover, computation of point multiples kP, $u_1P$ and $u_2(aP)$ will typically require significant modular reduction operations, the number of which depends on the procedure used to perform the point multiplication.

The reduction machine 22 is used to perform the reduction, either using Montgomery reduction or an alternative technique described below.

In Montgomery reduction, calculations with respect to a modulus n are carried out with the aid of an auxiliary number R called the Montgomery radix or base. When the modulus is a prime number, a good choice of radix is a power of two, typically chosen as the first convenient power of two larger than the modulus. In the following, the exponent of the power is denoted by L so that $R=2^L$. The Montgomery reduction of a number a with radix R and prime modulus n is the quantity given by $aR^{-1} \bmod n$. The Montgomery multiplication of two numbers is the Montgomery reduction of their product, written as $a\otimes b=abR^{-1} \bmod n$. Calculations are carried out on numbers in their Montgomery form. The Montgomery form of a number a is defined as $\hat{a}=a\otimes R \bmod n$. Conversion to Montgomery form may be carried out via Montgomery multiplication where $\hat{a}=a\otimes R^2=aR \bmod n$. Conversion from Montgomery form back to regular faun may be carried out by Montgomery reduction: $\hat{a}R^{-1} \bmod n=a \bmod n$, or the Montgomery multiplication: $\hat{a}\otimes 1=aRR^{-1}=a \bmod n$. The Montgomery exponentiation of a number may be carried out using a square-and-multiply methodology, as exemplified in Guide to Elliptic Curve Cryptography, Springer Verlag, 2004 by Hankerson et al. and, substituting Montgomery multiplication for the usual multiplication. The machine 22 may be implemented in a hardware or software module and operates on a set of parameters to produce a result. For example, the controller 24 conditions of the ALU 28 to produce the result $a\otimes b$ and inputs a and b from the register file 26. The machine 22 can be configured to also convert to and from Montgomery form. For converting to Montgomery form, the ALU 22 accepts a and $R^2$ as inputs and produces an output $\hat{a}$. Conversely, for converting back to normal form, the ALU 22 accepts $\hat{a}$ and 1 as inputs and outputs a.

The machine 22 may also be configured to calculate the Montgomery reduction of a value. In this case, the machine 22 is initialized with a modulus n and a radix R, accepts a and 1 as inputs and produces $aR^{-1} \bmod n$ as an output. In the example above, during signing, the integer $\overline{x}_1$ and value $k^{-1}$ (e+ar) are stored in the registers 26 and are reduced using the ALU 28.

As noted above, efficiency may be increased by pre-computing certain fixed values to be used in the calculations. Such values include $\mu=(-n)^{-1} \bmod 2^w$, for some w typically being the bit size of a word (or block) of the value (or perhaps the entire value) being operated on and $R^2 \bmod n$ which are stored in the memory 30.

Whilst the Montgomery reduction offers certain efficiencies, similar benefits may be obtained using the machine 22 but without requiring pre-computation. The technique may be utilized wherever a value equivalent to a lower order word can be represented by a word or words of a higher order, thereby allowing a substitution to be made that eliminates the lower order value. Generally, the modulus is a pseudo Mersenne prime. Preferably, the modulus is a pseudo-Mersenne prime modulus p in the form $p=2^wC-1$ where C is a sum of one or more positive powers of base 2. Examples of such modulus are NIST recommended primes $p_{192}$, which decomposes to $2^{192}-2^{64}-1$, or $p_{521}$ which decomposes as $2^{521}-1$.

As shown in FIG. 4, a value a to be reduced mod $p_{192}$ is stored in the register files 26 as an ordered row of 32 bit computer readable words. In the example, a is a 352 bit integer that extends across 12 columns, each 32 bits wide. The lowest order word column is designated $2^{0w}$, the highest $2^{11w}$. The machine 22 is utilized to produce a mod $p_{192}$ using successive substitutions of a low order word for a higher order equivalent. In the example given, $V=2^{192}-2^{64}$ so that $a_0V\equiv a_0$ (mod $p_{192}$) gives the equivalent substitution $a_0(2^{6w}-2^{2w})=a_0 0.2^{o2}$ (mod $p_{192}$).

Figure 3:
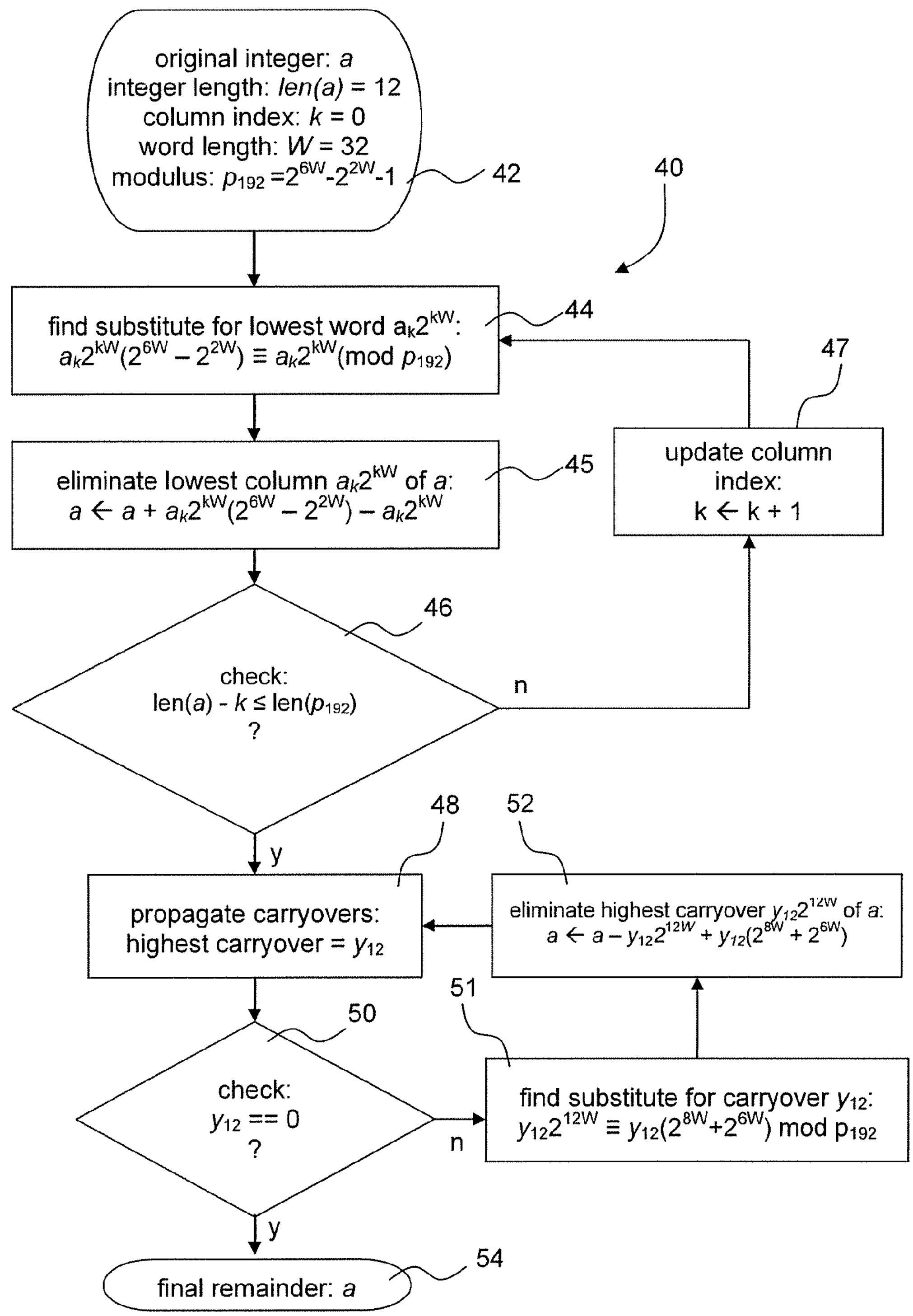
FIG. 3(*a*) is a schematic diagram of a method of performing a modulus reduction process.
Figure 3:
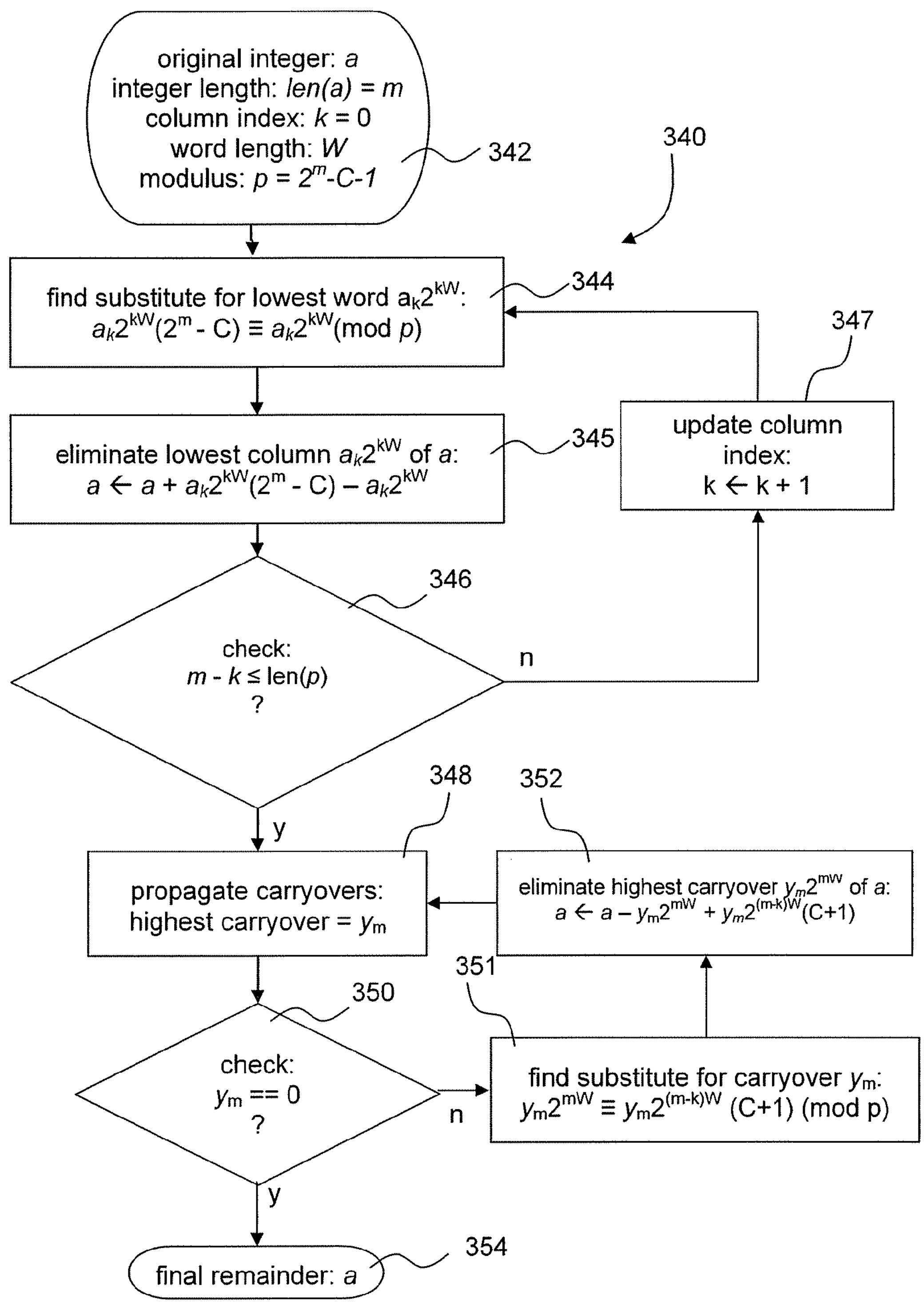

As can be seen in FIG. 3(*a*), the modulus reduction process initializes the machine 22 to input the parameters for the computation, namely the value a, which is read into the register files 26, the value length in words, column index k, that is initialized as k=0 and word length.

The initial step 44 eliminates the word value of the lowest word column of a by applying the equivalent substitution $a_0(2^{6w}-2^{2w})\equiv a_0(\text{mod } p_{192})$, where w is bit length of 32 for each of digital words. The lowest order word component $a_0$ is substituted by its higher order equivalent to yield the modular equality:

$$a_{11}\cdot 2^{11w}+\ldots+a_0 19\ 2^{0w}\equiv a_{11}\cdot 2^{11w}+\ldots+a_7\cdot 2^{7w}+(a_6+a_0)\cdot 2^{6w}+a_5\cdot 2^{5w}+\ldots+a_3\cdot 2^{3w}+(a_2-a_0)\cdot 2^{2w}+a_1\quad 2^{1w}(\text{mod } p_{192})$$

Thus, the controller selects the value of $a_0$ and adds it to the register 26 in the column representing $2^{6w}$ and subtracts if from column representing $2^{2w}$ and $2^{0w}$. The ALU 28 sums the two rows, indicated as 101$a$ and 101$b$ in FIG. 4 and returns a row 101$c$ representing the result.

It can be seen that the result of the substitution has eliminated the value $a_0 2^{0w}$ of the lowest 32-bit word column.

The initial step 44 of the process 40 of FIG. 3(*a*) corresponds to the first equivalent substitution 101$b$ that is used to eliminate the digital word $a_0$ of the lowest $(2^{0w})$ column. The substitution 101$b$ is obtained from the equivalence $a_0(2^{6w}-2^{2w})\equiv a_0(\text{mod } p_{192})$. It will be appreciated that, since the multiples of $a_0$ are word-aligned, it is not necessary to perform any calculations to obtain the substitute value 101$b$. The $a_0$ values can simply be copied to the appropriate columns.

Figure 5:
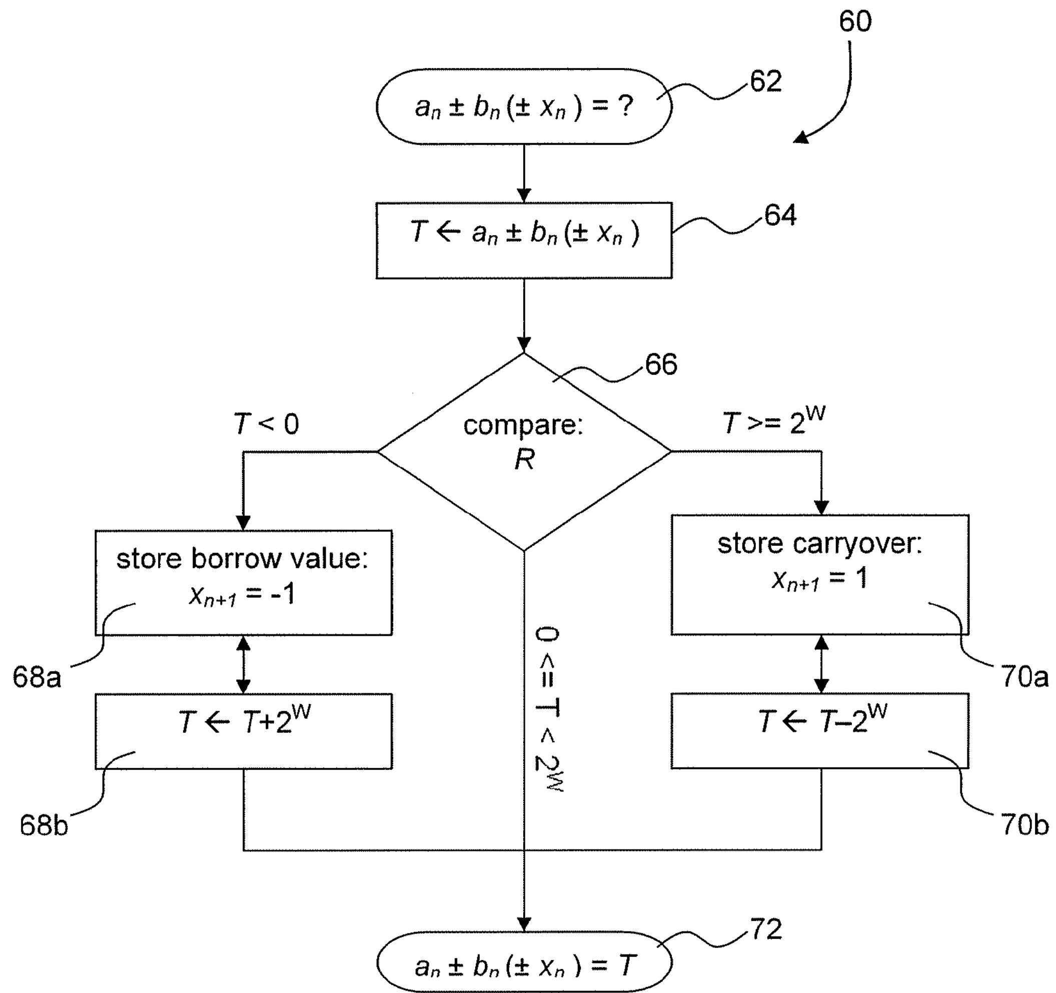
FIG. 5 is a schematic diagram of the method by which a column n is summed when using the method of FIG. 3(*a*) and FIG. 3(*b*).

The addition step 45 of FIG. 3(*a*) sums each column in isolation. As can be seen in the first step 101, $a_0$ is subtracted from $a_2$ in the $2^{2w}$ column and $a_0$ added to $a_6$ in the $2^{6w}$ column to obtain the first intermediate results 101$c$ and 101$d$. To determine the carries and borrows resulting from the summation, the addition process 60 shown in FIG. 5 is applied. It will be appreciated that the addition of the $2^{0w}$ column need not be performed. Since this column will not be used later on, its value can simply be assumed zero without summing through the process 60 in order to save computational effort.

The column addition process 60 is shown in FIG. 5 and can be applied to any column, denoted by index n. The first operation 64 performs a summation of all values in the column n and yields the sum T. Next, the comparison 66 evaluates the column sum T.

If that sum T is negative for column n, steps 68$a$ and 68$b$ are taken to first generate a borrow value $x_{n+1}=-1$ for the next higher column n+1. Then, the value of the borrowed word $2^w$ is added to the sum T to obtain a positive value.

If the sum T is greater than the word size of $2^w$, steps 70$a$ and 70$b$ are taken to first generate a carryover value $x_{n+1}=+1$ for the next higher column n+1. Then, the sum T is subtracted by $2^w$ to obtain a positive result that is less than the word size $2^w$.

In the third case, if neither carryover nor borrow conditions are satisfied, no further steps are taken to modify the sum T.

The column addition process 60 is applied to each column requiring summation. When all columns have been added to complete the addition step 45, the resulting borrow and carryover values 101*d* are also stored to be included at a later point. An example of this is shown in the calculation step 111 of FIG. 6. Carryover and borrow values $x_7$ and $x_3$ are dependent upon the summation as described in the addition process 60 of FIG. 5.

Referring back to FIG. 3(*a*), after applying an addition step 45 to eliminate the lowest column word, the process 40 now proceeds to a comparison step 46. This comparison is made following the first equivalent substitution 44 and addition 45 to determine whether further reductions need to be performed. In the comparison 46, the length of an intermediate result (ignoring eliminated columns, and ignoring stored borrows and carryovers) is compared with the length of the modulus in conventional (non pseudo-Mersenne) representation. While the non-zero word length of the intermediate results could be counted, there are alternative ways to obtain the value for the non-zero word length. The word length of the intermediate result (ignoring eliminated columns, and ignoring stored borrows and carryovers) can be represented as the initial word length of the original value a minus the current column index k. If, the comparison 46 shows that length of the intermediate result, additional eliminations are required to attain the reduction mod p.

Returning to the example process of FIG. 4, it is clear that the intermediate result 101*c* is much longer than the length of the modulus $p_{192}$ of six 32-bit words. Thus, the comparison condition 46 is not satisfied, and further reductions are required. Having eliminated the 32-bit digital word of the current lowest column, a step 47 increments the column index k so that the 32-bit digital word of the next column can be eliminated.

Further reductions require a return to step 44 to again reduce a from below. This time, the equivalent substitution $a_1 2^{1w}(2^{6w}-2^{2w}) \equiv a_1 2^{1w} (\text{mod } p_{192})$ is applied. The lowest field word component $a_1$ is thus substituted by its higher order equivalent to yield the modular equality:

$$\begin{aligned} a_{11}\cdot 2^{11w} + \ldots + a_0 \cdot 2^{0w} \equiv \\ a_{11}\cdot 2^{11w} + \ldots + a_8\cdot 2^{8w} + (a_7 + a_1 + [x_7])\cdot 2^{7w} + b_6\cdot 2^{6w} + \\ a_5\cdot +2^{5w} + a_4\cdot +2^{4w} + (a_3 - a_1 - [x_3])\cdot 2^{3w} + b_2\cdot 2^{w} (\text{mod} p_{192}) \end{aligned}$$

In a manner completely analogous to the first equivalent substitution 101, the second reduction iteration (44, 45) is performed to eliminate the $2^{1w}$ column. This is shown by example in FIG. 4 of an equivalent substitution step 102.

The second substitution 102 differs slightly from the first substitution 101. The carryover values of 101*d* from the previous step, are included in 102*b*. In the addition step, the carryover values 102*b* and modular substitute 102*c* are added simultaneously, thus reducing the number of addition calculations required.

The second intermediate result 102*d* and carryover 102*e* are again obtained through the process 60 of FIG. 5. Any carryover values 102*e* resulting will be again stored for the subsequent addition step, as was the case for the second addition step.

Referring back to FIG. 3*a*), an evaluation 46 is again made to determine whether additional substitutions need to be performed, and steps (44, 45) repeated to reduce the length of the integer a. The further steps 103-106 in the example of FIG. 4 show that the reduction 44, addition 45, and increment step 47 of column index k continue until the evaluation 46 is satisfied. As shown on FIG. 4, as the calculations progress, digital words $b_n$, $c_n$, $d_n$, and $e_n$ represent successive changed values of field word components $a_n$, while $x_n$, $y_n$ and $z_n$ represent single bit carry or borrow values. Parentheses indicate that a carry or borrow value optionally exists. The index of a digital word always denotes its column position.

The result is the last intermediate sum 106*d*, which has a length of six 32-bit words (ignoring stored carryovers). This result is equal to the length of the modulus $p_{192}$ in conventional (non pseudo-Mersenne) representation, which can be represented as seen in the comparison step 46 as the length of the original integer a minus the current column index k.

Once the value a has been reduced to a point where result 46 is finally satisfied, the next step 48 propagates the final borrow values through the residual value a.

The propagation step 48 results in a single propagated carryover value of $y_{12}$, and is exemplified by the step 107 seen in FIG. 4. The step 107 shows the result of adding the carryover and borrow values 106*e* to the intermediate result 106*d*. The process 60 shown in FIG. 5 is again used to sum each column, ensuring that all individual column sums are within the range of $[0, 2^w-1]$. However, the summation starts at the lowest order word column and ends at the highest order word column, with carryover and borrow values from the previous column being applied immediately to the next higher column.

Referring to the example of propagation shown in the example 117 of FIG. 7, it will be appreciated that a complete propagation of a borrow or carryover value is generally rare in practice. Since the magnitude of a carryover or borrow never exceeds 1, a borrow will only be continually propagated upwards when each successive higher column contains the minimum value 0. Similarly, carryovers will only be propagated when each successive higher column contains the maximum value $2^w-1$. As seen in the example 117, the first borrow $-x_7$ will only propagate using borrows $w_8$ through $w_{11}$ to the final carryover $y_{12}$ if the values of $b_8$ to $a_{11}$ are all 0. Conversely, the carryover $x_{12} \in \{0,1\}$ is generated much more frequently, since it only requires a single carryover from the sum of $a_{11}$, $x_{11}$ and $b_5$.

It will also be observed in the present example 117 of FIG. 7 that the final carryover value is $y_{12}$ will have a value of −1,0, or 1, i.e. $y_{12} \in \{-1,0,1\}$. This value for $y_{12}$ is a result of the sum of $x_{12}$, which is either 0 or 1, and the borrow propagation value, which is 0 or −1. Following this step, the value of the expression is $y_{12}\cdot 2^{12w}+c_{11}\cdot 2^{11w}+ \ldots +c_6\cdot 2^{6w}$. The lowest six words $c_1$ to $c_6$ are 0, and have been eliminated through substitution by higher order components.

Referring back to FIG. 3(*a*), an evaluation 50 of the final carryover value is made after the step 48 is taken to propagate all carryovers. If the final carryover value is non-zero, another reduction 52 is required.

The reduction step 52 is correspondingly shown in the example of the first carry reduction step 108 of FIG. 4. A different equivalent substitution of $y_{12}\cdot 2^{6w}\cdot(2^{6w}) \equiv y_{12}\cdot 2^{6w}\cdot(2^{2w}+1)$ mod $p_{192}$ is used to remove the highest carryover value $y_{12}$ by making a substitution of $y_{12}$ at the $2^{8w}$ and $2^{6w}$ columns. A propagation 48 is again used, with a carryover value $z_{12}$ possibly being generated for the next intermediate result 109.

It will be appreciated that in the result 109 shown in the example of FIG. 4, the carryover value from one full propagation is $z_{12} \in \{0,1\}$. This result follows from the three possible values of −1, 0 and 1 for $y_{12}$ in previous steps 107 and 108. These three conditions are explained as follows:

Firstly, if $y_{12}=0$, it will follow that $z_{12}=0$.

Secondly, if $y_{12}=1$, then the subsequent substitution of $y_{12}\cdot 2^{6w}\cdot(2^{6w})\equiv y_{12}\cdot 2^{6w}\cdot(2^2+1) \bmod p_{192}$ may result in a value of 0 or 1 for $z_{12}$, depending on propagation of carryovers.

Finally, if $y_{12}=-1$, the result for $z_{12}$ must be 0.

The final condition can be explained by referring the previous borrow propagation for $y_{12}=-1$, which resulted in the values $c_8=2^w-1$ and $c_6=2^w-1$. These values for $c_6$ and $c_8$ eliminate the possibility of any subtraction of $y_{12}$ propagating to set $z_{12}=-1$.

Referring back to the process 60 in FIG. 3*a*). An evaluation 50 of the final carryover value $z_{12}$ is once again made. If $z_{12}$ is a non-zero value (i.e. 1), the propagation 48 and reduction 52 will be done once again to eliminate the carryover. This can be seen in the final reduction step 110 of FIG. 4 where the values $e_{11}-e_6$ represent the reduction a mod $p_{192}$.

It will be appreciated that in the present embodiment, the steps 48, 52 and 54 reducing the carryover should not exceed two iterations. Additionally, it will be further appreciated that in the present embodiment, the results of the reduction should not be greater than the modulus $p_{192}$ while having no carryover, which would provide an incorrect reduction. This is because the reduction and propagation of $z_{12}=-1$ results in $z_{12}=0$ or 1, and subsequently, the reduction and propagation of $z_{12}=1$ always eliminates the carryover value $z_{12}$. These results allow the process 40 shown in FIG. 3*a*) to be modified so that two reduction and propagations are hardcoded to avoid the need for any evaluation 50.

Once the final carryover $Z_{12}$ is eliminated, the remaining words are taken as the modulus, ignoring the zeroes of the eliminated lower order columns.

In summary therefore, the integer to be reduced is represented as a string of w-bit words, and the lowest order word is substituted by higher order words of an equivalent value to eliminate the lowest order words. The substitution continues until the length of the non-zero words corresponds to the length of the modulus. As necessary, the individual columns are summed to determine borrow and carries. Upon reaching the length of the modulus, the borrows and carries are propagated from lowest word to highest and the highest carryover evaluated. Further, reductions and propagations are performed until the highest carryover is eliminated. The result of the reduction is represented by the remaining columns that have not been eliminated.

The column summation to determine carries and borrows may be performed after each substitution, or may be left until the substitutions are complete. Alternatively, the summation may be performed as memory resources dictate or when the result of a summation is required for further substitutions.

The process may be performed using the reduction machine 22 that may also be used for Montgomery reduction, with an appropriately modified instruction set for the controller 24, thereby enhancing the versatility of the machine 22. The intermediate values and results of the computations are stored in the registers 26 under the control of controller 24 to minimize interaction with the memory 30 as the reduction proceeds.

The controller 24 has access to an instruction set to retrieve and operate on the integers, condition the ALU 28 to perform the arithmetic operations required and to store the results of such operations. It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the controller 24 or accessible or connectable thereto. Any application or module herein described may be implemented using computer readable/executable instructions that may be stored or otherwise held by such computer readable media.

Although the examples above been described with reference to certain embodiments or preferred implementations thereof, it will be appreciated that other embodiments utilizing the same principles can be derived. Similar reduction methods to the example provided in FIG. 4 may be applied for other word aligned primes defined by the National Institute for Standards in Technology (NIST), such as the 224, 256-bit and 384-bit NIST primes. Different word sizes can be used in place of 32-bit words, with lower bit representations increasing the number of word aligned primes available.

The same general technique can be applied for non-word aligned pseudo-Mersenne primes such as the 521-bit NIST prime defined as $p_{521}2^{521}-1$. Under this use, the equivalence used for higher-order substitution is $2^{521}\equiv 1(\bmod p_{521})$. This prime is non-word aligned since 521÷32=16 with remainder 9. Equivalent substitutions are therefore best represented as $2^{16w}\cdot 2^9\ a_0\equiv a_0(\bmod p_{521})$, where w is the digital word length of 32.

Non-word aligned primes require a modification to the process described above with respect to FIG. 3(*a*). As shown on FIG. 3(*b*), in which like steps are identified with like reference numbers with a prefix 3 added for clarity, the process 340 of FIG. 3*b*) can be applied to modulus reduction by the 521-bit Mersenne prime. The substitution, $2^{16w}\cdot 2^9\ a_0\equiv a_0\ (\bmod p_{521})$ is utilized at step 344. The equivalent substitution of $a_0$ made at step 345 is used to eliminate the lowest column word.

An example of the low to high reduction using a 521-bit NIST prime with 32-bit length words is shown in FIG. 8. The non-word aligned multiple $2^9$ indicated at line 121 serves to shift the higher substituted component of $a_0$ to the left, i.e. toward the higher order word, by an additional 9 bits. This shift is exemplified in the first substitution step 122, where the higher order substitute $a_0$ is represented by components $s_1$ and $s_0$. The word value of $s_1$ is equal to $a_0$ shifted to the right by 23 bits, that is the 9 highest order bits of $a_0$ are aligned with the 9 lowest order bits of $2^{17w}$ while the word value $s_0$ is equal to $a_0$ shifted to the left by 9 bits so that the lowest 23 bits of $a_0$ are aligned with the highest 23 bits of the word in the $2^{16w}$ column. This preserves an equivalent relationship between $2^{16}w\cdot 2^9a_0$ and $2^{17w}\cdot s_1+2^{16w}\cdot s_0$. The substitution is repeated for each low order column until the required modulus is attained, as indicated at steps 46 and 47. After performing the non-word aligned method of column elimination, a low to high propagation can also be done as in the word aligned embodiment, by propagating the carryovers 348 and eliminating the final carryover at steps 350, 351 and 352.

The low-to-high reduction as described in the foregoing embodiments may also be applied on intermediate results in modular arithmetic, interleaved with other operations such as multiplication and squaring. "The Handbook of Applied Cryptography" by Menezes et al. describes the mixture of Montgomery reduction with other operations. Methods of modulus reduction according to the above examples may be substituted for Montgomery reduction.

The previously described embodiments have particular advantages.

Firstly, the successive elimination of the lowest column mitigates the carry from below that occur in high-to-low reduction. Carryover and borrow values can be subsequently included in the next substitution operation.

Secondly, modulus reduction can be achieved through successive substitution, and addition and subtraction operations. This avoids the need for any recurring multiplication and division required for a classical modulus reduction. The multiplication and precomputation requirement for Montgomery reduction is also eliminated. A final modulus reduction that is required for classical or Montgomery methods is avoided.

Thirdly, the method for using substitution, addition and subtraction for modulus determination reduces the types of operations required for and complexity of a modulus reduction machine, thus reducing its cost to manufacture and power consumption.

Fourthly, the method for modulus reduction is provided that can be done within the registers 26, without the requirement of additional random access memory or hardware storage, as is required for the Montgomery μ value.

Other versions are possible. First of all, any number of NIST word-aligned and non-word aligned primes may be used in addition to the 521-bit and 192-bit NIST primes taught by the above embodiments. These primes can then be substituted in a similar way, and the process 340 as shown in FIG. 3*b*) may be generally applied to those primes.

In the embodiments described herein, the value a is represented using signed 32-bit word representations. However, word lengths may be longer or shorter depending on the implementation. Word components may also be signed or unsigned. When implementing unsigned storage bits, negative values can be implemented either in specialized memory, or using subtraction procedures.

Under some embodiments, the carryover and borrow values may not be stored, but applied immediately in the current addition. This would allow the intermediate equivalent values to be output, if desired.

In other embodiments, the multiple carryover and borrow bits can be implemented in custom hardware in the cryptographic module 22 to make the modulus reduction process more efficient. However, the process as outlined above can equally be implemented in hardware or in software.

Additionally, other numbers having the property $a_0V \equiv a_0$ (mod p), where p=V−1 may be used as the modulus for a similar reduction from below.

The invention claimed is:

1. A computer implemented method in a computing device for reducing a value a to a reduction of the value modulo a modulus p, said modulus being represented by a data string having a length of g words, said method comprising:

a) representing, via a processor of the computing device, the value a as an ordered sequence of f words, where f is greater than g, said sequence thereby including (f−g) lower order words, each of said words of said sequence having a predetermined number of computer readable bits arranged in a bit pattern to represent a value of that word;

b) eliminating, via the processor, said (f−g) lower order words of said sequence so that not more than g words remain in said sequence by, for each of said lower order words, performing a substitution in said sequence of an equivalent value, modulo p, said equivalent value being represented by at least one word, each such word having an order higher than that of said lower order word for which such equivalent value is substituted, said substitution, being absent a multiplication operation step and applying a bit pattern representing said lower order word in said sequence to higher order words to provide said equivalent value, said substitution eliminating each said lower order word at each iteration to result in higher order words remaining in said sequence;

c) propagating, via the processor, carries and borrows stored in a memory of the computing device and arising during said substitutions of said equivalent values and performing further reduction in response to a presence of said carries indicated in the memory and subsequent to said propagation to maintain not more than g words in said sequence; and, d) utilizing, via the processor, the ordered sequence of g words remaining from the memory as a representation of the reduction of the value modulo p and, wherein said equivalent value includes a negative higher order word and said substitution includes a summation of like-order words and attribution of a borrow to an adjacent word of higher order when said summation produces a value less than a minimum word value.

2. A method according to claim 1 wherein lowest order words of said sequence are successively eliminated.

3. A method according to claim 1 wherein said carries and borrows are propagated toward highest order words of said sequence.

4. A method according to claim 1 wherein each of said substitutions of an equivalent value includes a summation of like-order words and attribution of a carry to an adjacent order word of higher order when said summation produces a value exceeding a maximum word value.

5. A method according to claim 4 wherein said summation includes carries attributed to said like-order words.

6. A method according to claim 4 wherein said summation is performed during elimination of said lowest order words.

7. A method according to claim 1 wherein a summation of like order words is performed after each substitution and a carry to an adjacent order word of higher order is attributed when said summation produces a value exceeding a maximum word value.

8. A method according to claim 1 wherein a summation of like order words is performed after said sequence has attained the word length of said modulus p and prior to propagation of carries and borrows.

9. A method according to claim 1, wherein said summation includes borrows attributed to like-order words.

10. A method according to claim 1 wherein said sequence includes a carryover bit to represent the result of propagation of said borrows and carries, and said carryover bit is examined to determine if further reduction is required after said propagation, said further reduction continued until eliminating a highest carryover bit.

11. A method according to claim 10 wherein said further reduction is performed using a different representation of an equivalent value, mod p.

12. A method according to claim 1 wherein said further reduction is performed by a predetermined number of substitutions.

13. A method according to claim 12 wherein said further reduction is performed using a different representation of an equivalent value, mod p.

14. A method according to claim 1 wherein said modulus p is a prime.

15. A method according to claim 14 wherein said prime is not word aligned and substitution of said equivalent value requires shifting of said representation of said lowest word so that bits of said representation are distributed between adjacent higher order words.

16. A method according to claim 14 wherein said prime is a word aligned prime having non-zero value bits at word boundaries.

17. A method according to claim 14 wherein said modulus p is a pseudo-Mersenne prime.

18. A method according to claim 17 wherein said modulus has the form $2^{w}C-1$ where C is a sum of one or more positive powers of base 2 and w is the number of computer readable bits in each of said words.

19. A method according to claim 18 wherein said modulus has the form $2^{192}-2^{64}-1$.

20. A method according to claim 18 wherein said modulus has the form $2^{521}-1$.

21. A method according to claim 1 wherein said equivalent value of higher order words is obtained from the relationship that $a_0V \equiv a_0 \pmod p$ where $V=p-1$ and V can be represented by one or more higher order words.

22. A cryptographic module on a computing device to perform cryptographic operations, said module comprising:

a) a reduction machine for reducing a value, a, to a reduction of the value modulus p, said modulus p being represented as a data string having a length of g words, said reduction machine including i) register files to store data; and ii) an arithmetic logic unit to read data from said register files, perform computations on said data, and return results of computations to said register files; and b) a controller for controlling operation of said reduction machine, based on executable instructions, by controlling operation of said register files and said arithmetic logic unit;

wherein said instructions are configured to cause said reduction machine to

I) enter said value a in said register files as an ordered sequence of f words, where f is greater than g; said register files including (f−g) lower order words, each of said words of said sequence having a predetermined number of computer readable bits arranged in a bit pattern to represent a value of that word;

II) eliminate said (f−g) lower order words of said sequence so that not more than g words remain in said sequence by, for each of said lower order words, performing a substitution in said sequence of an equivalent value, modulo p, said equivalent value being represented by at least one word and each such word having an order higher than that of said lower order word for which such equivalent value is substituted said substitution, being absent a multiplication operation step and applying the bit pattern of said lower order word in said sequence to high order words to provide said equivalent value, said substitution eliminating each said lower order word at each iteration to result in higher order words remaining in said sequence;

III) propagate carries and borrows arising during said substitutions of said equivalent values and perform further reduction in response to a presence of said carries indicated in the memory and subsequent to said propagation to maintain not more than g words in said sequence; and IV) output from said register files the ordered sequence of g words remaining as a representation of the reduction of the value modulo p and wherein said equivalent value includes a negative higher order word and said substitution includes a summation of like-order words and attribution of a borrow to an adjacent word of higher order when said summation produces a value less than a minimum word value.

23. A cryptographic module according to claim 22 wherein said carries and borrows are stored in said register files and associated with a respective one of said words, said arithmetic logic unit summing values stored in said register files and associated with respective ones of said words, and returning the result of such summation to said register files.

24. A non-transitory computer readable medium having stored thereon computer executable instructions for performing a method for reducing a value a to a reduction of the value modulo a modulus p, said modulus being represented by a data string having a length of g words, the computer executable instructions comprising instructions:

a) representing the value a as an ordered sequence of f words, where f is greater than g, said sequence thereby including (f−g) lower order words, each of said words of said sequence having a predetermined number of computer readable bits arranged in a bit pattern to represent value of that word:

b) eliminating said (f−g) lower order words of said sequence so that not more than g words remain in said sequence by, for each of said lower order words, performing a substitution in said sequence of an equivalent value, modulo p, said equivalent value being represented by at least one word and each such word having an order higher than that of said lower order word for which such equivalent value is substituted said substitution, being absent a multiplication operation step and applying the bit pattern of said lower order word in said sequence to high order words to provide said equivalent value, said substitution eliminating each said lower order word at each iteration to result in higher order words remaining in said sequence;

c) propagating carries and borrows arising during said substitutions of said equivalent values and performing further reduction in response to a presence of said carries indicated in the memory and subsequent to said propagation to maintain not more than g words in said sequence; and d) outputting the ordered sequence of g words remaining as a representation of the reduction of the value modulo p and wherein said equivalent value includes a negative higher order word and said substitution includes a summation of like-order words and attribution of a borrow to an adjacent word of higher order when said summation produces a value less than a minimum word value.

25. A non-transitory computer readable medium according to claim 24 wherein lowest order words are successively eliminated.

26. A non-transitory computer readable medium according to claim 24 wherein said carries and borrows are propagated toward highest order words of said sequence.

* * * * *